United States Patent
Su

(10) Patent No.: US 12,014,000 B2
(45) Date of Patent: Jun. 18, 2024

(54) ACTIVE STYLUS RECEIVING CIRCUIT WITH INTERPOLATED SAMPLING POINTS AND TOUCH PANEL SYSTEM USING ACTIVE STYLUS PEN

(71) Applicant: FocalTech Systems Co., Ltd., Hsinchu (TW)

(72) Inventor: Fang-Yi Su, Hsinchu (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 0 days.

(21) Appl. No.: 18/322,238

(22) Filed: May 23, 2023

(65) Prior Publication Data
US 2024/0019958 A1 Jan. 18, 2024

(30) Foreign Application Priority Data

Jul. 12, 2022 (TW) .................................. 111126059

(51) Int. Cl.
*G06F 3/041* (2006.01)
*G06F 3/0354* (2013.01)
*G06F 3/038* (2013.01)
*G06F 3/044* (2006.01)

(52) U.S. Cl.
CPC ...... *G06F 3/04162* (2019.05); *G06F 3/03545* (2013.01); *G06F 3/0383* (2013.01); *G06F 3/0442* (2019.05); *G06F 3/0446* (2019.05)

(58) Field of Classification Search
CPC .......... G06F 3/04162; G06F 3/03545; G06F 3/0383; G06F 3/0442; G06F 3/0446
See application file for complete search history.

(56) References Cited

U.S. PATENT DOCUMENTS

| | | | | |
|---|---|---|---|---|
| 11,531,425 B1* | 12/2022 | Shen | ............ | G06F 3/0418 |
| 2013/0169601 A1* | 7/2013 | Mo | ............ | G06F 3/0383 |
| | | | | 345/179 |
| 2013/0176275 A1* | 7/2013 | Weaver | ............ | G06F 3/0446 |
| | | | | 345/173 |
| 2014/0035863 A1* | 2/2014 | Li | ............ | G06F 3/04162 |
| | | | | 345/174 |

(Continued)

FOREIGN PATENT DOCUMENTS

| | | |
|---|---|---|
| CN | 107850964 A | 3/2018 |
| TW | 201721373 A | 6/2017 |

*Primary Examiner* — Adam J Snyder
(74) *Attorney, Agent, or Firm* — MUNCY, GEISSLER, OLDS & LOWE, P.C.

(57) ABSTRACT

An active stylus receiving circuit receives a vector data signal transmitted by an active stylus. The vector data signal carries vector data. The vector data includes in-phase data and quadrature data. The active stylus receiving circuit includes an analog-to-digital converter, an interpolation circuit and a demodulation circuit. The analog-to-digital converter samples and converts the vector data signal into digital signal with a plurality of sampling points. The interpolation circuit performs interpolating operation on the digital signal, so as to increase the number of sampling points representing the digital signal, and generate interpolated digital signal. The demodulation circuit performs demodulating operation on the interpolated digital signal to generate demodulated in-phase data and demodulated quadrature data, thereby obtaining demodulated vector data.

8 Claims, 4 Drawing Sheets

(56) References Cited

U.S. PATENT DOCUMENTS

| | | | |
|---|---|---|---|
| 2014/0267071 A1* | 9/2014 | Shahparnia | G06F 3/0442 345/173 |
| 2014/0327644 A1* | 11/2014 | Mohindra | G06F 3/044 345/174 |
| 2015/0130731 A1* | 5/2015 | Chang | G06F 3/0442 345/173 |
| 2015/0301651 A1* | 10/2015 | Leigh | G06F 3/04166 345/174 |
| 2019/0129569 A1* | 5/2019 | Chou | G06F 3/04166 |
| 2021/0026490 A1* | 1/2021 | Yang | G06F 3/0418 |
| 2022/0353119 A1* | 11/2022 | Putra | G06F 3/04182 |

* cited by examiner

ACTIVE STYLUS RECEIVING CIRCUIT WITH INTERPOLATED SAMPLING POINTS AND TOUCH PANEL SYSTEM USING ACTIVE STYLUS PEN

CROSS-REFERENCE TO RELATED APPLICATIONS

This application claims the benefits of the Taiwan Patent Application Serial Number 111126059, filed on Jul. 12, 2022, the subject matter of which is incorporated herein by reference.

BACKGROUND

Field of the Disclosure

The present disclosure relates to the technical field of active stylus and, more particularly, to an active stylus receiving circuit and a touch panel system using the active stylus.

Description of Related Art

Active stylus has been widely used in conjunction with electronic devices with touch panels to provide input effects, wherein a transmitting circuit is provided inside the active stylus to transmit modulated vector data signal, which is then received by the touch panel to detect the touch coordinates of the active stylus. In order to correctly receive and demodulate the vector data signal transmitted by the active stylus, a plurality of sensors are arranged on the touch panel to sense the aforementioned vector data signal, and a corresponding receiving circuit receives the vector data signal for performing demodulating operation so as to obtain vector data.

In the process of modulation, transmission, reception and demodulation of the aforementioned vector data, the active stylus performs, for example, modulating operation on the vector data with a carrier, wherein the vector data includes in-phase data and quadrature data. After modulation, the vector data signal is transmitted by the active stylus and is then received by the corresponding receiving circuit. The receiving circuit uses an analog-to-digital converter (ADC) to convert the received vector data signal into a digital signal, and then uses the in-phase carrier and quadrature carrier to perform demodulating operation on the digital signal so as to obtain the in-phase data and the quadrature data, respectively, thereby obtaining the original vector data.

During the operation process of the aforementioned touch panel using the active stylus, one of the main reasons that affects the performance of the active stylus is the data sampling rate of the analog-to-digital converter of the receiving circuit. If the amount of sampling data is large, the active stylus will perform better in anti-noise capability. Conversely, if the amount of sampling data is small, the active stylus is likely to be disturbed by noise. Therefore, under the condition of limited sampling rate of the analog-to-digital converter, it often takes a lot of hardware area to meet the specifications of the active stylus, which is unable to satisfy the actual needs.

Therefore, in the design of the prior active stylus receiving circuit, there are still many deficiencies that need to be mitigated and/or obviated.

SUMMARY

An object of the present disclosure is to provide an active stylus receiving circuit and a touch panel system using an active stylus. By using the active stylus interpolation technology, the performance of the active stylus can be effectively improved, and the ability of anti-interference and anti-noise can be increased, while the front-end analog circuit area can be reduced.

In one aspect of the present disclosure, there is provided an active stylus receiving circuit for receiving vector data signal transmitted by an active stylus, wherein the vector data signal carries vector data that includes in-phase data and quadrature data. The active stylus receiving circuit includes: an analog-to-digital converter for sampling and converting the vector data signal into digital signal with a plurality of sampling points; an interpolation circuit for performing interpolating operation on the digital signal to increase the number of sampling points representing the digital signal so as to generate interpolated digital signal; and a demodulation circuit for performing demodulating operation on the interpolated digital signal to generate demodulated in-phase data and demodulated quadrature data, so as to obtain demodulated vector data.

In another aspect of the present disclosure, there is provided a touch panel system, which includes: an active stylus for transmitting vector data signal carrying vector data, wherein the vector data includes in-phase data and quadrature data; a touch panel having a plurality of sensors for sensing the vector data signal transmitted by the active stylus; and a receiving device having a plurality of active stylus receiving circuits, each active stylus receiving circuit corresponding to at least one sensor. The active stylus receiving circuit includes: an analog-to-digital converter for sampling and converting the vector data signal into digital signal having a plurality of sampling points; an interpolation circuit for performing interpolating operation on the digital signal to increase a number of the sampling points representing the digital signal so as to generate interpolated digital signal; and a demodulation circuit for performing demodulating operation on the interpolated digital signal to generate demodulated in-phase data and demodulated quadrature data, so as to obtain demodulated vector data.

Other novel features of the disclosure will become more apparent from the following detailed description when taken in conjunction with the accompanying drawings.

DETAILED DESCRIPTION OF EMBODIMENT

In order to make the purpose, technical solutions and advantages of the present disclosure more clear, the present disclosure will be described in further detail below in conjunction with the accompanying drawings and embodiments. It should be understood that the specific embodiments described here are only used to explain the embodiments of the present disclosure, and are not intended to limit the present disclosure.

Figure 1:
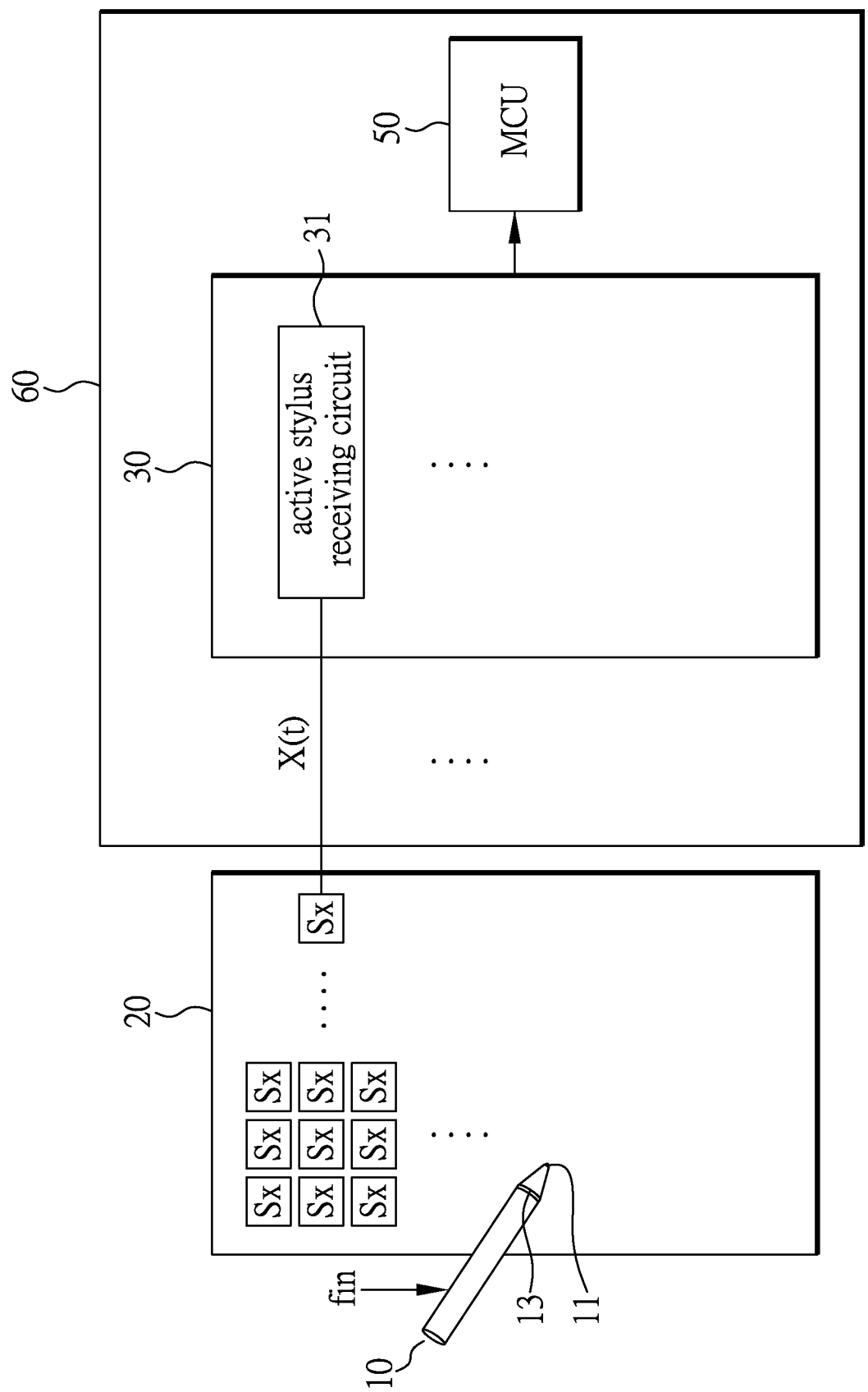
FIG. 1 shows the touch panel system using an active stylus according to the present disclosure.

FIG. 1 shows the touch panel system using an active stylus according to the present disclosure, which includes an active stylus 10, a touch panel 20, and a receiving device 30, wherein the receiving device 30 is arranged in an integrated circuit (IC) 60, and the integrated circuit 60 further has a microcontroller (MCU) 50. The active stylus 10 has a tip 11 and a ring 13, which can transmit vector data signal with a transmitting frequency fin, and the touch panel 20 has a plurality of sensors Sx, which can sense the vector data signal transmitted by the tip 11 or ring 13 of the active stylus 10. The receiving device 30 has a plurality of active stylus receiving circuits 31 to receive the vector data signal X(t) for processing so as to obtain the vector data transmitted by the active stylus 10. It is noted that the touch panel 20 in this embodiment may be an in-cell touch display panel, an independent touch panel or other electronic devices with similar functions at the time of this application.

Figure 2:
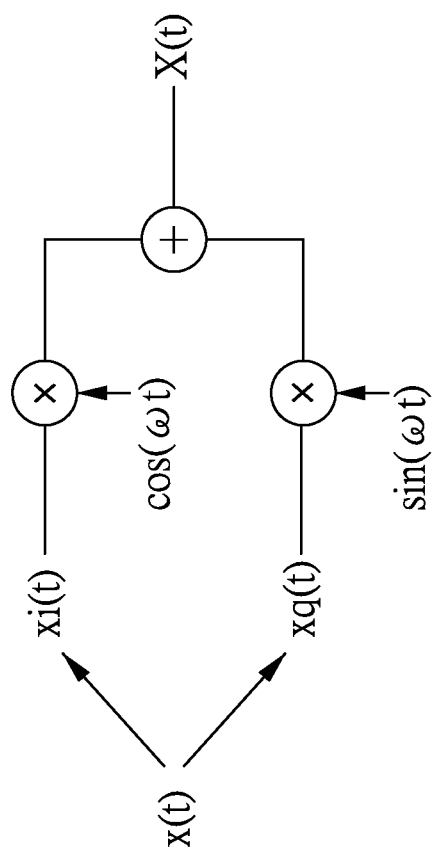
FIG. 2 is a schematic diagram of the active stylus that transmits vector data signal.

FIG. 2 is a schematic diagram of the active stylus 10 that transmits the vector data signal X(t). As shown, the active stylus 10 uses, for example, carrier signal cos(ωt)+sin(ωt) having in-phase modulation carrier signal cos(ωt) and quadrature modulation carrier signal sin(ωt) to perform modulating operation on the vector data x(t), so that the vector data signal X(t) carries the vector data x(t), wherein the vector data x(t) includes in-phase data xi(t) and quadrature data xq(t). The modulated vector data signal X(t)=xi(t)×cos(ωt)+xq(t)sin (ωt) is transmitted from the tip 11 or ring 13 of the active stylus 10.

With reference to FIG. 1 and FIG. 2, the sensors Sx of the touch panel 20 may sense the vector data signal X(t) transmitted by the tip 11 or ring 13 of the active stylus 10, which is then received by the corresponding active stylus receiving circuit 31 of the receiving device 30, wherein each active stylus receiving circuit 31 corresponds to at least one sensor Sx, and one active stylus receiving circuit 31 may receive the vector data signal X(t) sensed by the plurality of sensors Sx in a multiplexed manner.

Figure 3:
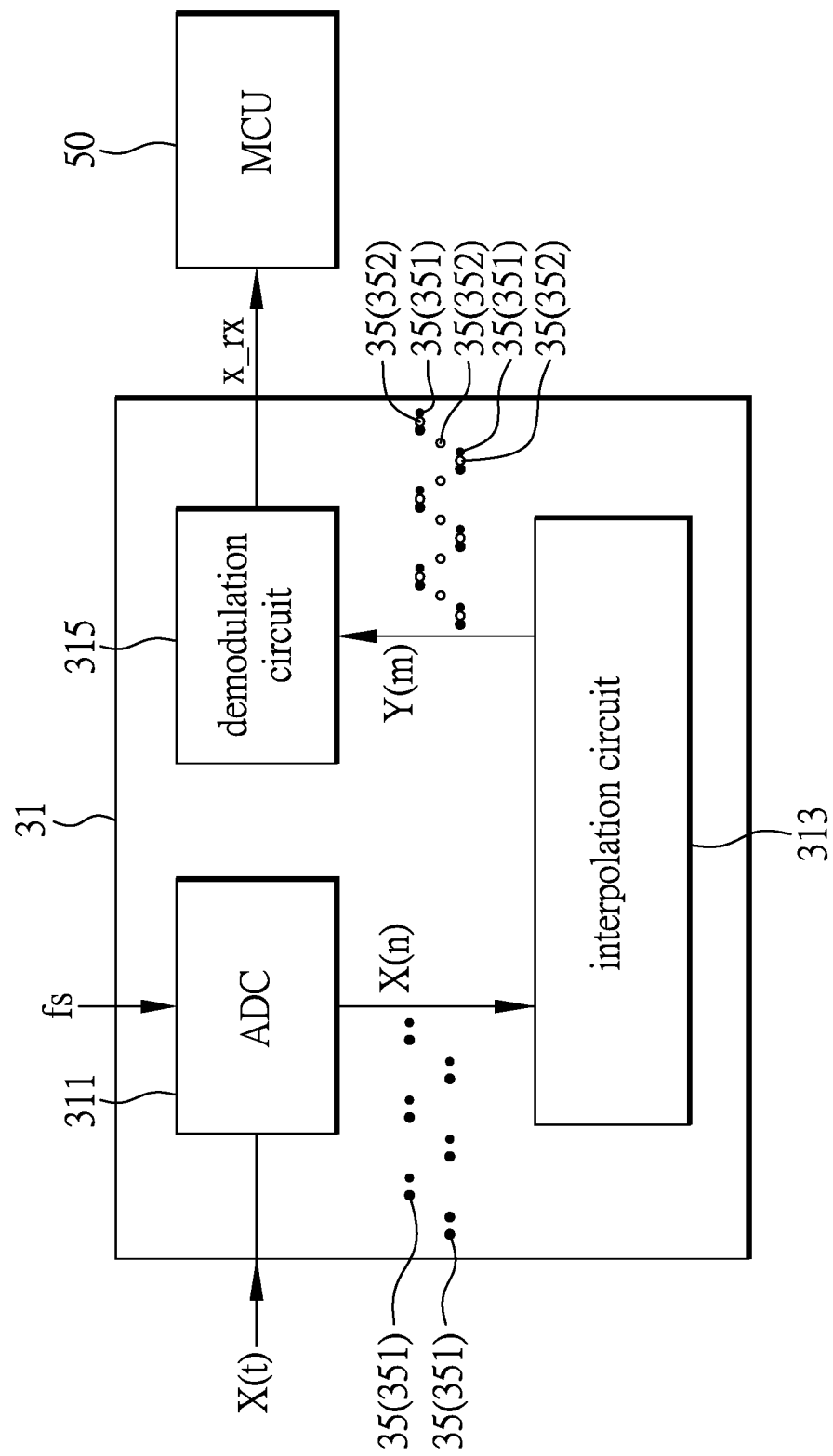
FIG. 3 is a schematic diagram of the active stylus receiving circuit.

FIG. 3 is a schematic diagram of the active stylus receiving circuit 31. As shown, each active stylus receiving circuit 31 includes an analog-to-digital converter (ADC) 311, an interpolation circuit 313 and a demodulation circuit 315, wherein the analog-to-digital converter 311 uses a sampling frequency fs to perform sampling on the received vector data signal X(t), which is then converted into n-bit digital signal X(n)=xi(n)×cos((2π×n×fin)/fs)+xq(n)×sin((2π×n×fin)/fs), where fs is the sampling frequency of the analog-to-digital converter 311, fin is the transmission frequency at which the active stylus 10 transmits the vector data signal X(t), and the digital signal obtained through sampling and conversion has a plurality of sampling points 35.

In order to improve the performance of the active stylus 10, and increase the anti-interference and anti-noise ability and reduce the circuit area, in the active stylus receiving circuit 31, the interpolation circuit 313 is provided to perform interpolating operation on the digital signal X(n), so that the number of sampling points 35 representing the digital signal X(n) can be increased. As shown in FIG. 3, the original sampling points 351 representing the digital signal X(n) are denoted by solid circles, and the sampling points 351 of solid circle are distributed sparsely, which may not be enough to fully represent the vector data signal X(t). Therefore, the interpolation circuit 313 is used to perform interpolating operation on the digital signal X(n) to interpolate additional sampling points 352 calculated through calculation of the interpolation circuit 313 and denoted by hollow circles between the sampling points 351 of solid circle, so that the distribution of the overall sampling points 35 becomes dense, and thus the vector data signal X(t) can be completely represented. In one embodiment of the present disclosure, after the interpolation circuit 313 performs interpolating operation on the digital signal X(n), the digital signal generated after interpolation may be expressed as:

$$Y(m) = \begin{cases} \dfrac{X(n) + X(n+1)}{2}, & m = 2, 4, 6 \to \infty, n = \dfrac{m}{2} \\ X(n), & m = 1, 3, 5 \to \infty, n = \text{floor}\left(\dfrac{m}{2}\right) + 1 \end{cases}$$

where Y( ) represents the interpolated digital signal, X( ) represents the digital signal outputted by the analog-to-digital converter 311, and floor( ) represents the floor function. For example, Y(1)=X(1), Y(2)=(X(1)+X(2))/2, Y(3)=X(2), Y(4)=(X(3)+X(4))/2, and so on.

The aforementioned interpolation circuit 313 may adopt any interpolating operation technique to perform interpolating operation on the digital signal X(n), such as the two-point interpolation method as described in the aforementioned embodiment, but the present disclosure is not limited thereto. The interpolating operation adopted by the interpolation circuit 313 may be various interpolation methods such as polynomial interpolation method or original value interpolation method, which are known to the person skilled in the art and thus a detailed description therefor is deemed unnecessary.

Figure 4:
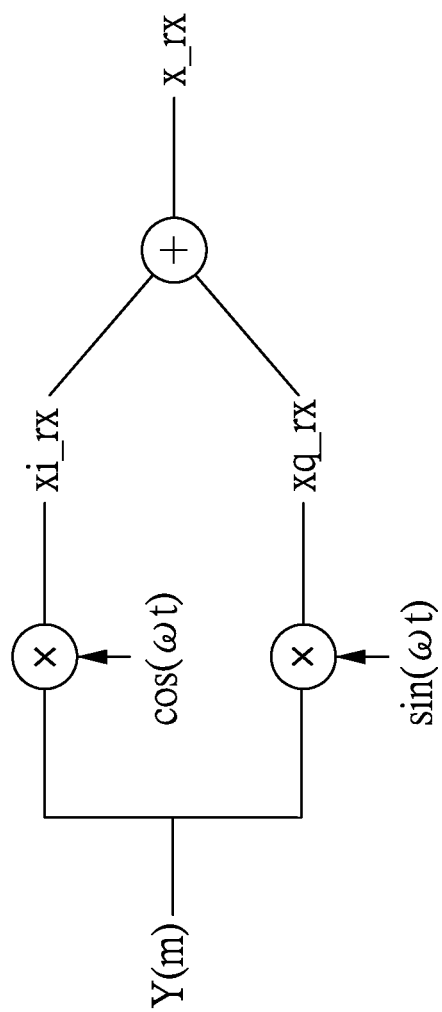
FIG. 4 is a schematic diagram of the demodulation circuit that demodulates the interpolated digital signal.

With reference to FIG. 3 again, the demodulation circuit 315 performs demodulating operation on the interpolated digital signal Y(m) to generate the demodulated vector data x_rx. FIG. 4 is a schematic diagram of the demodulation circuit 315 demodulating the interpolated digital signal Y(m), wherein the demodulation circuit 315 uses the in-phase modulation carrier signal cos(ωt) to perform demodulating operation on the interpolated digital signal Y(m) to generate the demodulated in-phase data xi_rx, and uses the quadrature modulation carrier signal sin(ωt) to perform demodulating operation on the interpolated digital signal Y(m) to generate the demodulated quadrature data xq_rx, so as to obtain the demodulated vector data x_rx=xi_rx+xq_rx, which is then transmitted to the microcontroller 50 shown in FIG. 1 for performing calculation to obtain the coordinate data of the active stylus 10.

In view of the foregoing, it is known that, in the present disclosure, the interpolation circuit can be used to perform interpolating operations on the digital signal outputted by the analog-to-digital converter, so that the number of sampling points representing the digital signal may be increased, and thus the vector data signal may be completely represented, thereby effectively improving the performance of the active stylus, increasing the anti-interference and anti-noise ability and reducing the circuit area.

The aforementioned specific embodiments should be construed as merely illustrative, and not limiting the rest of the present disclosure in any way.

The invention claimed is:

1. An active stylus receiving circuit for receiving vector data signal transmitted by an active stylus, the vector data signal carrying vector data including in-phase data and quadrature data, the active stylus receiving circuit comprising:
an analog-to-digital converter for sampling and converting the vector data signal into digital signal with a plurality of sampling points;
an interpolation circuit for performing interpolating operation on the digital signal to increase the number of sampling points representing the digital signal so as to generate interpolated digital signal; and a demodulation circuit for performing demodulating operation on the interpolated digital signal to generate demodulated in-phase data and demodulated quadrature data, so as to obtain demodulated vector data, wherein the digital signal generated after the interpolation circuit performs interpolating operation is:

$$Y(m) = \begin{cases} \dfrac{X(n) + X(n+1)}{2}, & m = 2, 4, 6 \to \infty, n = \dfrac{m}{2} \\ X(n), & m = 1, 3, 5 \to \infty, n = \text{floor}\left(\dfrac{m}{2}\right) + 1 \end{cases},$$

where Y( ) represents interpolated digital signal, X( ) represents digital signal outputted by the analog-to-digital converter, and floor( ) represents a floor function.

2. The active stylus receiving circuit as claimed in claim 1, wherein the vector data signal is: xi(t)cos(πωt)+xq(t)sin(ωt), where xi(t) represents in-phase data, xq(t) represents quadrature data, cos(ωt) represents in-phase modulation carrier signal, and sin(ωt) represents quadrature modulation carrier signal.

3. The active stylus receiving circuit as claimed in claim 2, wherein the digital signal obtained by sampling and converting the vector data signal through the analog-to-digital converter is: xi(n)×cos((2π×n×fin)/fs)+xq(n)×sin((2π×n×fin)/fs), where fs is a sampling frequency of the analog-to-digital converter, and fin is a transmitting frequency at which the active stylus transmits the vector data signal.

4. The active stylus receiving circuit as claimed in claim 1, wherein the demodulation circuit uses in-phase modulation carrier signal to perform demodulating operation on the interpolated digital signal to generate demodulated in-phase data, and uses quadrature modulation carrier signal to perform demodulating operation on the interpolated digital signal to generate demodulated quadrature data, so as to obtain the demodulated vector data represented by xi_rx+xq_rx, where xi_rx represents demodulated in-phase data, and xq_rx represents demodulated quadrature data.

5. A touch panel system, comprising:
an active stylus for transmitting vector data signal carrying vector data, wherein the vector data includes in-phase data and quadrature data;
a touch panel having a plurality of sensors for sensing the vector data signal transmitted by the active stylus; and
a receiving device having a plurality of active stylus receiving circuits, each active stylus receiving circuit corresponding to at least one sensor, and including:

an analog-to-digital converter for sampling and converting the vector data signal into digital signal having a plurality of sampling points;
an interpolation circuit for performing interpolating operation on the digital signal to increase a number of the sampling points representing the digital signal so as to generate interpolated digital signal; and
a demodulation circuit for performing demodulating operation on the interpolated digital signal to generate demodulated in-phase data and demodulated quadrature data, so as to obtain demodulated vector data, wherein the digital signal generated after the interpolation circuit performs interpolating operation is:

$$Y(m) = \begin{cases} \dfrac{X(n) + X(n+1)}{2}, & m = 2, 4, 6 \to \infty, n = \dfrac{m}{2} \\ X(n), & m = 1, 3, 5 \to \infty, n = \text{floor}\left(\dfrac{m}{2}\right) + 1 \end{cases},$$

where Y( ) represents interpolated digital signal, X( ) represents digital signal outputted by the analog-to-digital converter, and floor( ) represents a floor function.

6. The touch panel system as described in claim 5, wherein the vector data signal generated by the active stylus using carrier signal to modulate the vector data is: xi(t)cos(πωt)+xq(t)sin(ωt), where xi(t) represents in-phase data, xq(t) represents quadrature data, cos(ωt) represents in-phase modulation carrier signal, and sin(ωt) represents quadrature modulation carrier signal.

7. The touch panel system as claimed in claim 6, wherein the digital signal obtained by sampling and converting the vector data signal through the analog-to-digital converter is: xi(n)×cos((2π×n×fin)/fs)+xq(n)×sin((2π×n×fin)/fs), where fs is a sampling frequency of the analog-to-digital converter, and fin is a transmitting frequency at which the active stylus transmits the vector data signal.

8. The touch panel system as claimed in claim 5, wherein the demodulation circuit uses in-phase modulation carrier signal to perform demodulating operation on the interpolated digital signal to generate demodulated in-phase data, and uses quadrature modulation carrier signal to perform demodulating operation on the interpolated digital signal to generate demodulated quadrature data, so as to obtain the demodulated vector data represented by xi_rx+xq_rx, where xi_rx represents demodulated in-phase data, and xq_rx represents demodulated quadrature data.

* * * * *